P. BARGION.
Improvement in Mode of Attaching Axles to Hubs.
No. 131,077. Patented Sep. 3, 1872.
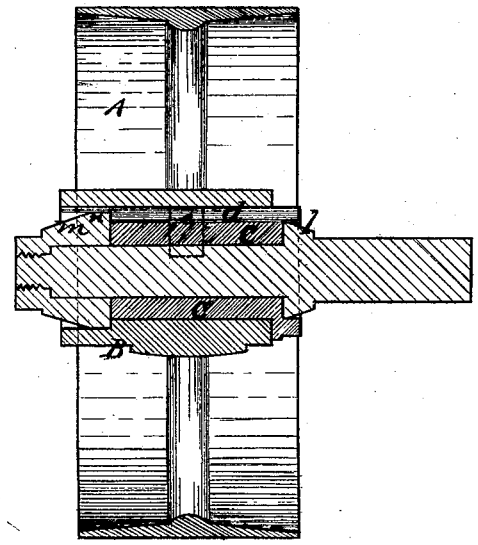
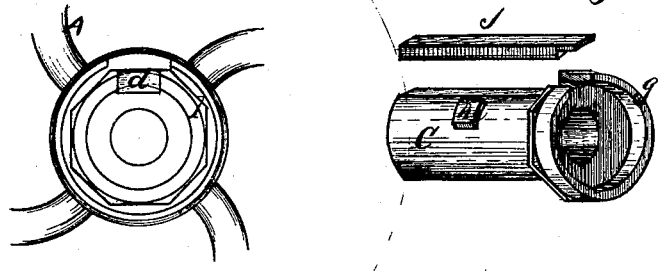
Witnesses  Inventor

UNITED STATES PATENT OFFICE.

PETER BARGION, OF STOCKTON, CALIFORNIA, ASSIGNOR TO JOHN CAINE, OF SAME PLACE.

IMPROVEMENT IN MODES OF ATTACHING AXLES TO HUBS.

Specification forming part of Letters Patent No. 131,077, dated September 3, 1872; antedated August 29, 1872.

SPECIFICATION.

*To all whom it may concern:*

Be it known that I, PETER BARGION, of Stockton, county of San Joaquin, State of California, have invented Improvements in Hubs and Axles; and I do hereby declare the following description and accompanying drawing are sufficient to enable any person skilled in the art or science to which it most nearly appertains to make and use my said invention or improvement without further invention or experiment.

The first part of my invention relates to improvements in securing boxes in the hubs of wheels. My device is more especially applicable to the cast-iron wheels used on gang and other plows, and on other similar wheels. The second part of my invention relates to a conical flange and nut, which are used to prevent sand from working into the box and cutting it out.

In order to explain my invention so that others will be able to understand its nature and operation, reference is had to the accompanying drawing forming a part of this specification, in which—

Figure 1 is a view of the axle and nut. Fig. 2 is a vertical section of the wheel and axle. Fig. 3 is a view of the box.

A represents a wheel such as is used upon gang-plows, cultivators, reapers, and other agricultural implements. The hub B of this wheel I bore out large enough to admit the box C. I then make a square channel, $d$, at one side of the bore entirely through the hub, as shown. At about the middle of the bore I make a short channel, $e$, at right angles to the channel $d$, and communicating with it. The box F has the projecting flange or rim $g$ at one end, and also has a lug, $h$, projecting from it at a proper distance from the flanged end, to be turned into the short channel $e$ in the manner of forming a bayonet-lock after the box has been slipped into the bore of the hub, the lug passing in through the channel $d$. The flange $g$ is also recessed opposite the channel $d$, and a wooden or other key, $j$, is driven into the channel, so as to confine the box in place and prevent its shifting. Upon the axle K I make a flange, $l$, at the proper distance from the end of the journal, to fit against the inner end of the box F. This flange is large enough to fit in the recessed end of the box, and has its outer corner beveled off, as shown, so as to exclude any dirt or sand which would otherwise get into the box. In order to protect the opposite or outer end of the box from dirt and sand, I employ a nut, $m$, having a large beveled flange or head, $n$, which screws upon the outer end of the journal, thus providing a beveled or conical flange at each end of the box to prevent dirt or sand from getting into it.

The object in thus constructing the hub and providing it with a box, is to save the wheel when the box is worn out. All that will be necessary to do will be to get a new box and the wheel will be ready for use again.

Having thus described my invention, what I claim, and desire to secure by Letters Patent, is—

1. The hub B, provided with the channels $d$ and $e$, in combination with the box F, having the channeled head or flange $g$, and lug $h$, substantially as and for the purpose above described.

2. The journal K, having the beveled flange $l$, in combination with the nut $m$, having the beveled or conical flange $n$, substantially as and for the purpose above described.

In witness whereof I hereunto set my hand and seal.

PETER BARGION. [L. S.]

Witnesses:
 JOSEPH BADGER,
 H. L. MILLER.